Mar. 3, 1925.

E. R. CLEMENTS

HOG OILER

Filed Dec. 16, 1924

Inventor
E. R. Clements
By Watson E. Coleman
Attorney

Mar. 3, 1925.  
E. R. CLEMENTS  
HOG OILER  
Filed Dec. 16, 1924    2 Sheets-Sheet 2
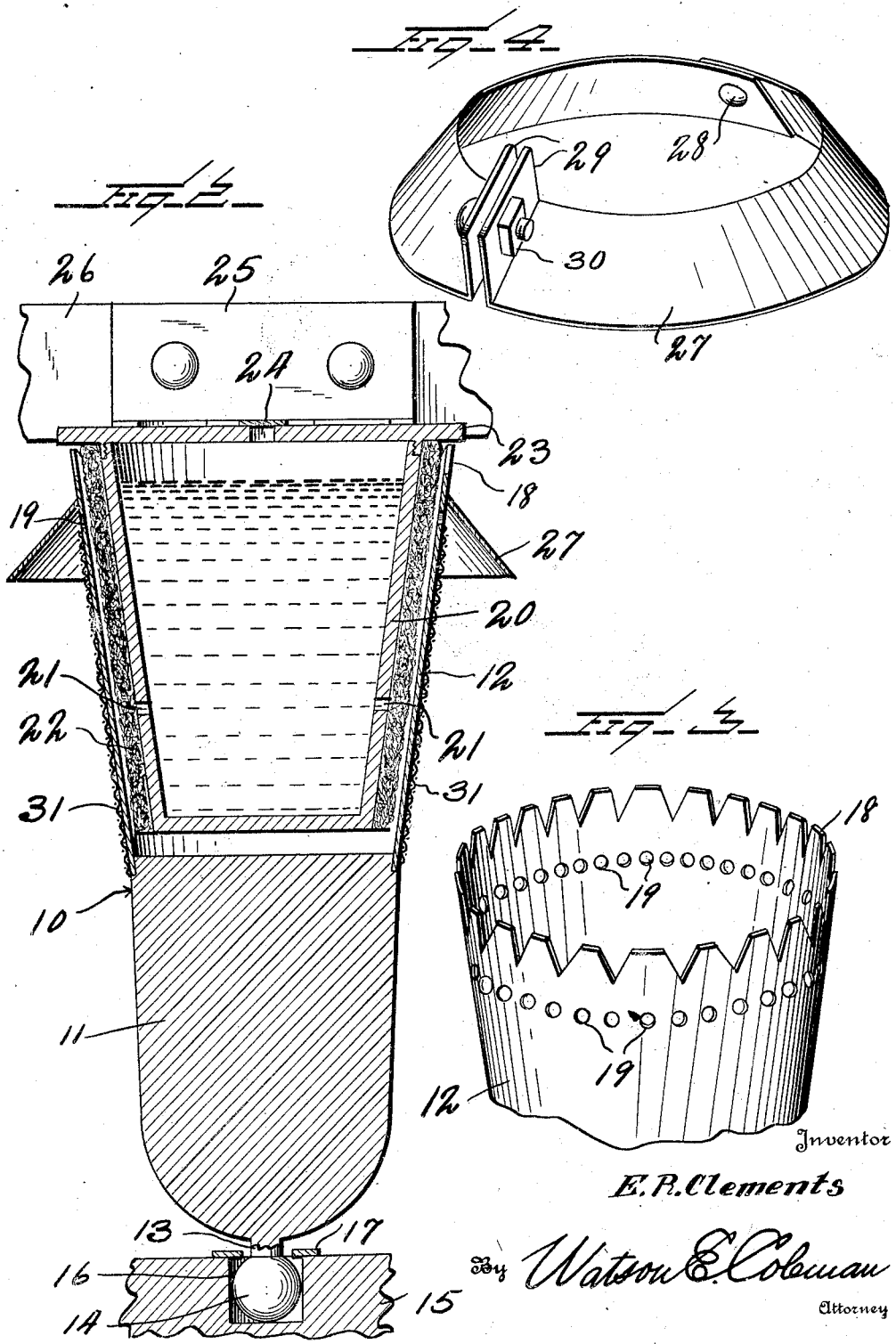

Patented Mar. 3, 1925.

1,528,402

UNITED STATES PATENT OFFICE.

ELMER R. CLEMENTS, OF RIVERTON, NEBRASKA.

HOG OILER.

Application filed December 16, 1924. Serial No. 756,284.

*To all whom it may concern:*

Be it known that I, ELMER R. CLEMENTS, a citizen of the United States, residing at Riverton, in the county of Franklin and State of Nebraska, have invented certain new and useful Improvements in Hog Oilers, of which the following is a specification, reference being had to the accompanying drawings.

This invention relates to hog oilers, and particularly to a hog oiler of the general type disclosed in my pending application Serial #703,435, filed on the 21st day of April, 1924.

In my prior application was shown a hog oiler in which there was an oil container surrounded by an outer layer of felt or like woven material, which in turn was surrounded by a flexible jacket, the container being formed with perforations whereby the oil could exude onto the felt layer, the felt layer absorbing the oil and this oil rubbing off upon the hog's back.

The present invention has the same general object as my prior invention, but more specifically is intended to provide a device of this character in which there is an inner container and an outer casing so mounted with relation to the inner container that the casing can, by pressure, be forced against the felt surrounding the container and thus oil forced out upon the outer casing and caused to dribble down the same so that as the hog rubs himself against the casing the oil will be applied to his back and sides.

A further object is to provide a device of this character which will become operative to squeeze oil out upon the exterior surface of the casing by pressure in any direction.

A still further object is to provide a device of this character wherein there is a skirt which may be so disposed that part of the oil forced out upon the casing may be discharged upon the back of the hog, while the oil on the surface of the casing is discharged against the side of the hog.

Another object is to provide a device of this character in which the outer casing is supported by a ball and socket joint so that the outer casing may oscillate in any direction to bring pressure to bear against the inner container and the felt covering thereof.

Other objects have to do with the details of construction and arrangement of parts as will appear more fully hereinafter.

My invention is illustrated in the accompanying drawings, wherein:—

Figure 2 is a vertical sectional view through the hog oiler;

Figure 3 is a perspective view of the upper portion of the oiler;

Figure 4 is a perspective view of the skirt or drip flange;

Figure 1:
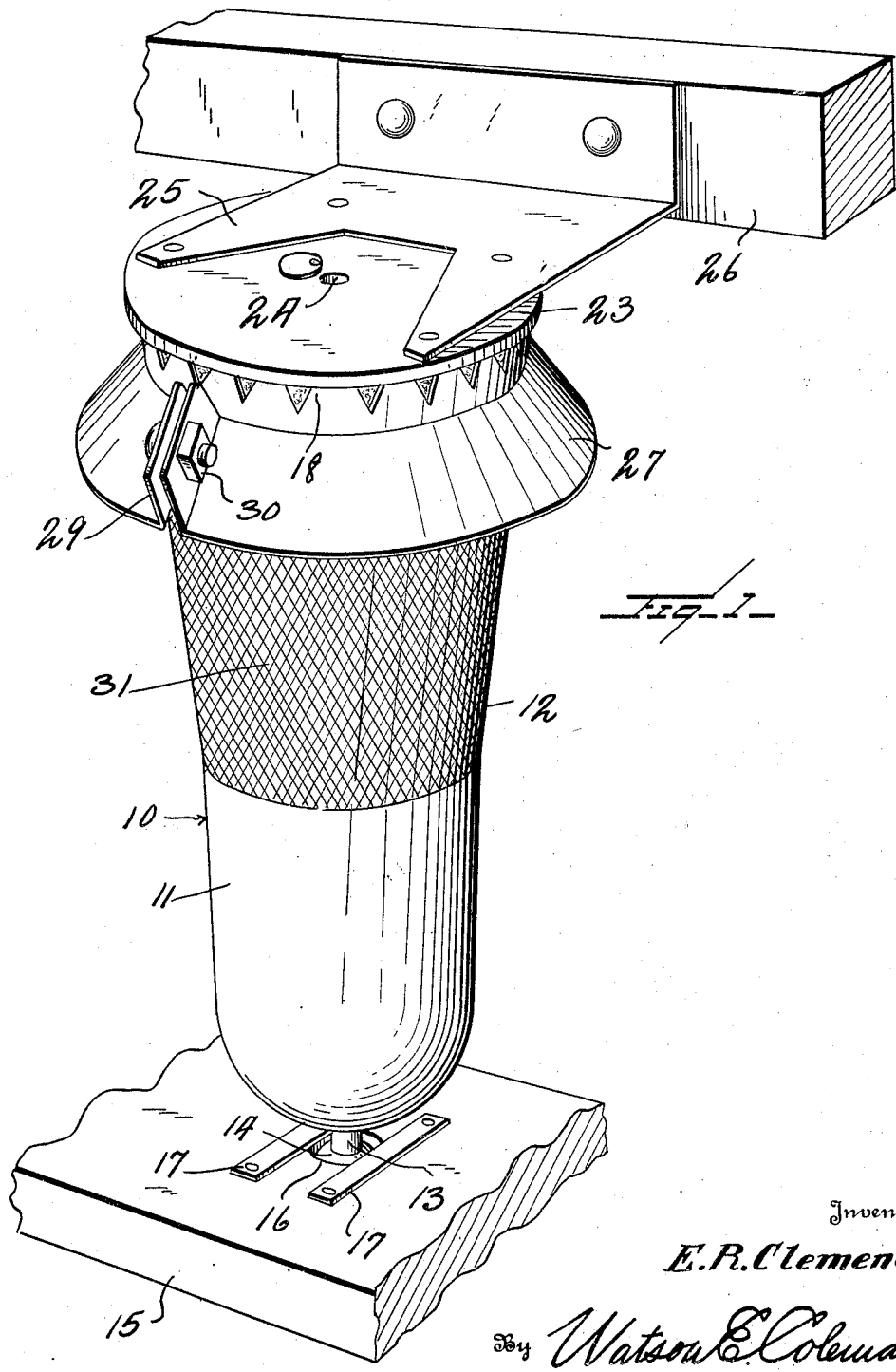
Figure 1 is a perspective view of a hog oiler constructed in accordance with my invention.

Referring to these drawings, it will be seen that I have illustrated a hog oiler comprising an outer, substantially cup-shaped casing, designated 10, this cup-shaped casing, generally speaking, tapering toward its lower end. The upper end of the casing is upwardly and outwardly flared. The lower end of the casing is shown as being approximately cylindrical with a rounded bottom. While the upper and lower portions of the casing might be made in one piece, I preferably form the casing with a lower portion 11 which may be solid or hollow and which might be made of iron, concrete, earthenware, wood or any other suitable material, the upper portion of the casing 12 being preferably made of sheet metal, attached to the lower portion of the casing in any suitable manner. The extreme lower end of the portion 11 is provided with a neck 13 having at its lower end a ball 14.

A supporting base 15, which is illustrated as a plank, is hollowed out, as at 16, for the reception of the ball 14, and disposed over this recess and bearing upon the ball 16 are two parallel strips 17. Thus a ball and socket joint is constituted which will permit the oscillation of the casing 10 in any direction. The upper edge of the casing 10 is preferably scalloped or formed with notches 18 and below these notches with perforations 19.

Disposed within the upper end of this casing 10 is a downwardly tapering oil receptacle or container 20 which is perforated at 21 at a plurality of points and is surrounded by a jacket or layer 22 of felt or sheepskin. This felt is attached to the face of the receptacle 20 by any suitable means and the upper end of the casing 10 is of larger diameter than the upper end of the receptacle 20 with its layer of felt 22. A cover 23 is mounted upon the upper end of the receptacle 10, this cover being provided with an opening 24 whereby oil may be filled into the receptacle. This opening may be closed in any suitable manner. This cover is attached to a bracket 25, which in turn is attached to any supporting structure as, for instance, the transverse beam 26, it being understood that I do not wish to be limited to any particular form of the supporting structure.

Preferably, though not necessarily, I provide a skirt or drip flange 27 which is formed in two sections pivoted to each other at 28, these sections at their free extremities being outwardly flanged, as at 29, and bolted to each other by a bolt 30. Thus the skirt may be removed or adjusted upon the casing 10. This skirt may be disposed above the perforations 19 and below the notches 18 or it may be disposed below the perforations 19. The purpose of this flange or skirt is to cause the oil which exudes from the perforations 19 and through the notches 18 to be directed outwardly and downwardly upon the hog's back. All of the oil which passes through the perforations 19 and the notches 18 may be thus directed or only the oil which passes out through the notches 18, as desired.

Preferably the exterior surface of the casing 10 is roughened so as to afford a scratching post for the hog and thus render the device attractive to the animal, this roughening being accomplished by covering the exterior surface of the casing 10 with wire netting 31. Any other means of roughening the surface may be provided, however. The casing 10 may be perforated at other points than at the top in order to permit the ready exudation of the oil, but I have found in actual practice that it is only necessary that the casing be perforated at its upper end, as the oil will be absorbed by the absorbent layer 22, and then as the outer casing is forced inward against the oil-soaked pad or layer 22, the oil will be forced out of the upper portion of the layer and will run downward over the exterior face of the casing and over the drip flange 27 so that the exterior face of the casing will be abundantly oiled by the use of the perforations and notches.

As before remarked, when the casing is forced against the felt layer 22, the oil will be forced onto that portion of the felt layer which is not compressed and will be forced upward and over the top edge of the casing and through the perforations 19, and then when pressure is relieved this relatively dry portion of the felt layer will absorb more oil.

As previously stated, the approximately conical casing 10 is greater in diameter than the total diameter of the container 20 with the felt layer 22 so that the casing can oscillate with relation to the latter in all directions. Thus it will be obvious that as the hog rubs himself against the casing the oil will be forced out upon the exterior face thereof and down over the skirt and down over the exterior of the casing and onto the hog. Thus the sides and back of the hog will be fully oiled.

I do not wish to be limited to the particular manner of mounting this casing, as various means for giving a ball and socket joint support to the casing may be provided. While I have referred above to the use of felt or sheepskin as the absorbent layer, I do not wish to be limited thereto as any absorbent material might be used in place thereof. Neither do I wish to be limited to the details of construction, as these might be modified in many ways without departing from the spirit of the invention.

I claim:—

1. A hog oiler of the character described comprising a perforated oil container supported in fixed position and having an outer jacket of fibrous, absorbent material, a casing surrounding the jacket and larger in diameter than the exterior diameter of the jacket, the casing being formed to permit the passage of oil to the exterior of the casing and the casing being concentric to the jacket but mounted for bodily movement toward or from the jacket.

2. A hog oiler of the character described comprising an oil container and having perforated side walls, a jacket of fibrous material surrounding the oil container, the oil container and jacket being downwardly tapered, a casing extending upward from below around the jacket and having a diameter greater than the jacket, the casing being apertured to permit the passage of oil from the jacket onto the exterior face of the casing, means for supporting the jacket in a fixed position and means independent of the jacket supporting means for supporting the casing for bodily movement in all directions toward or from the jacket.

3. A hog oiler of the character described comprising a downwardly tapering oil container having perforated side walls, a jacket surrounding the oil container, means for rigidly supporting the oil container and jacket, a casing having an upwardly flaring portion concentric to the jacket and surrounding the same, the interior diameter of the casing being larger than the exterior diameter of the jacket, a supporting member for the casing, the supporting member for the casing having a universal joint permitting the casing to be moved in all directions toward and from the jacket.

4. A hog oiler of the character described comprising a downwardly tapering oil container having perforated side walls, a jacket surrounding the oil container, means for rigidly supporting the oil container and jacket, a casing having an upwardly flaring portion concentric to the jacket and surrounding the same, the interior diameter of the casing being larger than the exterior diameter of the jacket, a supporting member for the casing, the casing and the supporting member having a ball and socket joint connection whereby the casing may be shifted in all directions toward and from the jacket.

5. A hog oiler of the character described comprising a downwardly tapered oil container having perforations in its sides, a layer of fibrous material mounted upon the exterior face of the oil container, a casing disposed below the oil container but extending up around the jacket but in spaced relation thereto, means for supporting the casing so that it may move in all directions toward or from the jacket, and a skirt carried by the jacket adjacent its upper end and acting to direct oil outward and downward.

6. A hog oiler of the character described comprising a downwardly tapered oil container having perforations in its sides, a layer of fibrous material mounted upon the exterior face of the oil container, a casing disposed below the oil container but extending up around the jacket but in spaced relation thereto, means for supporting the casing so that it may move in all directions toward or from the jacket, and a skirt adjustably mounted upon the casing and extending downwardly and outwardly around the same and adapted to deflect oil outward of the jacket.

7. A hog oiler of the character described comprising a downwardly tapering container, a jacket of absorbent material surrounding the same, means for supporting the container, the casing disposed below the container and the upper portion of the casing being upwardly and outwardly flaring and extending around the jacket in spaced relation thereto, and means independent of the supporting means for the casing for supporting the casing so that it may move bodily toward or from the jacket in all directions, the exterior face of the casing being roughened for the purpose described.

8. A hog oiler including an oil container having perforated side wall, a layer of absorbent material surrounding the side wall and in contact therewith, and an outer casing approximately concentric to the absorbent layer and supported for bodily movement toward or from the container whereby to compress the absorbent layer and force oil out of the exterior face of the casing.

In testimony whereof I hereunto affix my signature.

ELMER R. CLEMENTS